United States Patent
Propp et al.

(10) Patent No.: US 7,406,094 B2
(45) Date of Patent: Jul. 29, 2008

(54) POWER LINE COMMUNICATION NETWORK

(75) Inventors: Michael B. Propp, Brookline, MA (US); David L. Propp, Thornhill (CA); Khaled Saab, Randolph, MA (US); Du Thi Do, Toronto (CA); John Jakson, Marlborough, MA (US)

(73) Assignee: Adaptive Networks, Inc., Newton, MA (US)

( * ) Notice: Subject to any disclaimer, the term of this patent is extended or adjusted under 35 U.S.C. 154(b) by 909 days.

(21) Appl. No.: 10/333,581

(22) PCT Filed: Apr. 17, 2001

(86) PCT No.: PCT/US01/12553

§ 371 (c)(1),
(2), (4) Date: Nov. 18, 2003

(87) PCT Pub. No.: WO01/80435

PCT Pub. Date: Oct. 25, 2001

(65) Prior Publication Data

US 2004/0075535 A1 Apr. 22, 2004

Related U.S. Application Data

(60) Provisional application No. 60/198,144, filed on Apr. 17, 2000, provisional application No. 60/198,143, filed on Apr. 17, 2000.

(51) Int. Cl.
H04L 12/42 (2006.01)

(52) U.S. Cl. .................................... 370/449

(58) Field of Classification Search .............. None
See application file for complete search history.

(56) References Cited

U.S. PATENT DOCUMENTS

| 5,301,303 | A | 4/1994 | Abraham et al. |
| 5,769,032 | A | 6/1998 | Yarnall, Sr. et al. |
| 5,914,938 | A | 6/1999 | Brady et al. |
| 6,118,833 | A | 9/2000 | Bergmans et al. |
| 6,459,692 | B1 * | 10/2002 | Ben-Michael et al. ........ 370/341 |
| 6,798,775 | B1 * | 9/2004 | Bordonaro et al. .......... 370/392 |

* cited by examiner

Primary Examiner—Chi H. Pham
Assistant Examiner—Anh-Vu Ly
(74) Attorney, Agent, or Firm—Fish & Richardson P.C.

(57) ABSTRACT

A media access control (MAC) controller is disclosed for a network providing communication for network stations located at a plurality of customer premises and sharing a communication medium, each of the premises having a plurality of network stations. The MAC controller includes a virtual local area network (vLAN) controller, providing access to the communication medium for and communication among the stations located at a single customer's premises, to define a vLAN between them. A group local area network (gLAN) controller provides access to the communication medium for and communication among interfering vLANs, two vLANs being considered to be interfering when one can sense communications over the medium from a station in the other. A MAC controller is provided in at least one station in a vLAN. The MAC controller is preferably connected to use as the communication medium the portion of a power line at the output of the last step down transformer and utilizes a token passing protocol to control access to the medium.

21 Claims, 7 Drawing Sheets

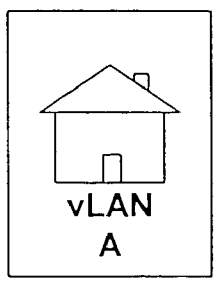
Fig. 3
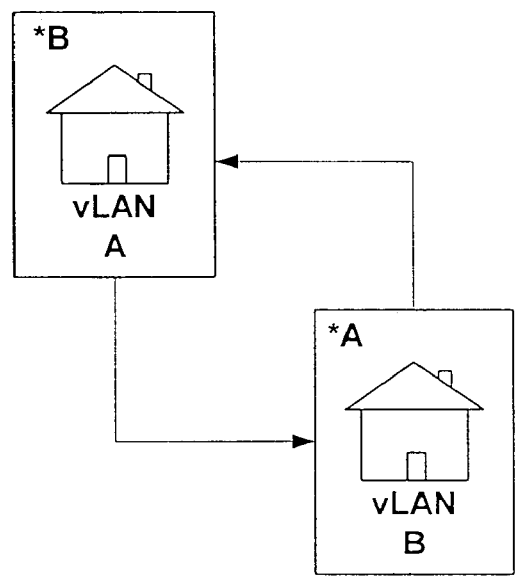
Fig. 4
Fig. 5
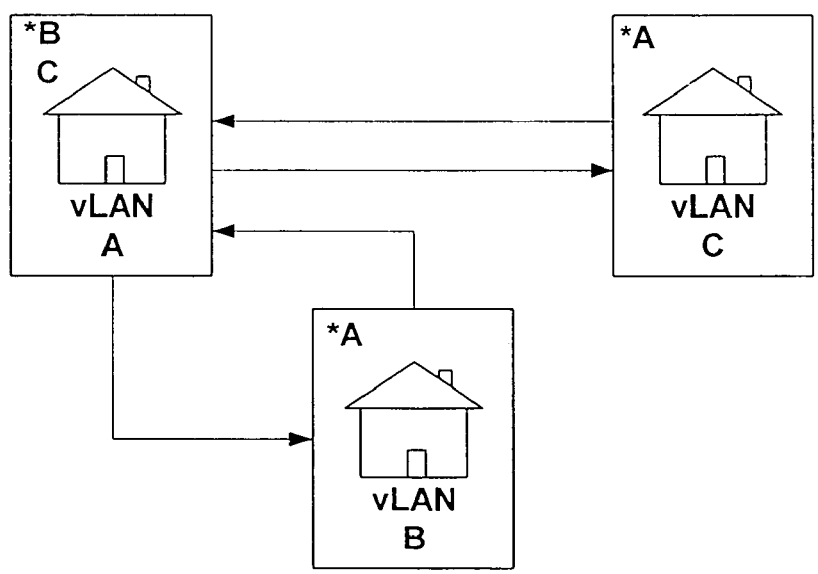

POWER LINE COMMUNICATION NETWORK

CROSS-REFERENCE TO RELATED APPLICATIONS

This application is a National Stage of International Application No. PCT/US01/12553, filed Apr. 17, 2001, which claims the benefit of U.S. Provisional Application No. 60/198,144, filed Apr. 17, 2000, and U.S. Provisional Application No. 60/198,143, filed Apr. 17, 2000, both of which are incorporated by reference.

FIELD OF THE INVENTION

The present invention relates generally to power line communication systems and, more particularly, concerns a local area network which provides communication over conventional power lines.

BACKGROUND OF THE INVENTION

Power line communication systems have found relatively little application in the United States. Nevertheless, power lines would appear to present an ideal, pre-existing communication medium for a network in which the expense of the usual forms of network media are unwarranted, such as a home network. For example, one could visualize that, in the not too distance future, all appliances and all electrical and the electronic devices in a home could be connected in a network through their power lines, so that the homeowner could control all such devices through his computer or appropriate terminal and have ready access to such services as entertainment, Internet and telephone.

Despite the attractiveness of a power line communication network, it does present its own unique problems. For one thing, the electronic, electrical and electromechanical devices connected to the power lines of a home produce various types of electrical noise which finds its way onto the power lines and make them a relatively noisy medium. This not only means that appropriate measures need to be taken to assure reliable synchronization and acceptable bit error rates, but collision detection becomes very difficult necessitating a token passing protocol for reliable media access control.

The token ring protocol relies on a physical ring topology which is inapplicable to the power line network, where all stations are essentially on one line or bus. A power line network is more amenable to the Token Bus Protocol. However, that protocol requires that all the stations on the medium must be able to hear all other stations so that they can be given access to the medium in a logical ring arrangement. In a power line local area network, some of the stations may not be able to hear others or may be out of communication range. In accordance with the present invention, it therefore became necessary to define a new protocol for the Media Access Control (MAC), which will be referred to herein as the Powerline MAC (PMAC) protocol.

In accordance with the present invention, there is also defined a unique network architecture. It includes a virtual LAN (vLAN), which contains all the stations constituting a single customer's network, such as a home network. A vLAN could, for example, include all of the stations in a single home or a single apartment within a building.

Since power lines are shared among different homes or different apartments, it is likely that different vLANs will interfere with each other on the power line. The network architecture therefore includes a group LAN (gLAN), which contains a plurality of vLANs, each of which interferes with at least one other vLAN. The vLANs comprising a gLAN share a single token, to ensure that two stations on such vLANs cannot talk at the same time.

The system architecture also contemplates a PMAC, which comprises the entire power line on the customer side of the last step-down transformer that delivers power to the customers.

In accordance with the PMAC protocol, a two-level token passing loop is provided. On the first level, there are the stations comprising a vLAN, and inside the vLAN, a vLAN coordinator acts as a vLAN controller to manage access to the network by its nodes, using polling. On the second level, the vLAN coordinators from each vLAN act as gLAN controllers to form a gLAN token passing logical ring by using a double-linked loop in which two vLANs which cannot communicate to each other pass the token through a third vLAN with which both vLANs can communicate. The third vLAN merely passes the token between the other two vLANs, without retaining it. The third vLAN will, however, be able to retain the token when it receives it in its normal sequence in the logical ring. Thus, each vLAN coordinator receives the token once during its travel around the logical ring as a potential token holder, but it may receive a token multiple times as a token passer.

In accordance with another aspect of the present invention, the PMAC protocol includes a three-way handshake process for token passing. A completed token pass involves the transfer of a "token pass" message from the originator to the recipient, an acknowledgment (ACK) by the recipient, and a handshake return by the originator. In order to secure against the loss of token in the noisy power line environment, the three-way handshake sends a retry remaining count with the token pass and waits for an ACK response. If the ACK is received, a handshake is sent, but if it is not, the token pass is resent with a decremented retry remaining count until the count is zero. On the recipient side, upon receiving a token pass, an ACK is sent and the retry remaining count is decremented. If a handshake is received, the recipient takes control. Otherwise, the recipient decrements the retry remaining count and resends the ACK and retry remaining count, until a retry remaining count is zero.

In accordance with a further aspect of the PMAC protocol, a unique process is provided for allocating access time to the transmission medium. A token rotation time (TRT) is defined for each round trip of the token through the logical ring of the gLAN. One of the vLAN coordinators is defined as the Token Master, which determines a vLAN token hold time vTHT for each vLAN by dividing the TRT by the total number of vLANs. Token mastership is transferred after each round trip of the token through the gLAN. Loss of token mastership is prevented by maintaining a token heartbeat which is incremented each time token mastership is passed. As soon as a vLAN coordinator observes the same token heartbeat twice, it seizes mastership to prevent loss of mastership.

In accordance with another aspect of the PMAC protocol, polling overhead is managed by granting medium access to nodes of an active connection at a rate required to maintain quality of service guarantees. A node without an active connection is granted access at a much slower rate determined at the convenience of the protocol.

In accordance with another aspect of the PMAC protocol, a narrow synchronization window is enabled around the expected synchronization preamble to increase the chances of receiving a proper transmission in the noisy power line medium. Precise inter-frame gap timing and predictable response size are provided. The precise inter-frame gap allows the transmitter to trigger its receiver in relationship to the end of its transmission, and the predictable response size allows the transmitter to time the start of its next transmission in the event that it misses the receiver's response.

In accordance with another aspect of the invention, the reliability of synchronization and equalizer adjustment are enhanced by sampling each symbol of a received signal at a multiple (as used herein, this will be understood as not necessarily an integer multiple) of the Nyquist rate for the number of symbols corresponding to the synchronization preamble. Specifically, N samples (where N is a multiple of the Nyquist rate) are acquired for each of the first M symbols in the received signal, where M is the number of symbols in the synchronization preamble. Each group of samples corresponding to a symbol is then correlated with the nominal sequence of symbols comprising the synchronization preamble, and the BER is determined between the nominal sequence and each sample position of the received symbols. The preceding steps are repeated in successive sample positions of the received signal. For synchronization purposes, we use the position of the received signal which yields the lowest BER.

In accordance with another aspect of the invention, an equalizer is permitted to converge on an optimal setting to achieve minimal BER. Modulation with a lower bit rate is used while the equalizer converges and is changed to the normal bit rate as the optimal setting is approached.

BRIEF DESCRIPTION OF THE DRAWINGS

The foregoing brief description, as well as further objects, features and advantages of the present invention will be understood more completely from the following detail description of presently preferred embodiments, with reference being had to the accompanying drawings, in which:

FIG. 3 illustrates a gLAN made up of a single vLAN;

FIG. 4 is a functional block diagram illustrating the connection of a vLAN A and a vLAN B in a single-threaded loop;

FIG. 5 is a functional block diagram illustrating three vLANs A, B and C connected in a double-linked loop;

DETAILED DESCRIPTION OF THE PREFERRED EMBODIMENT

Figure 1:
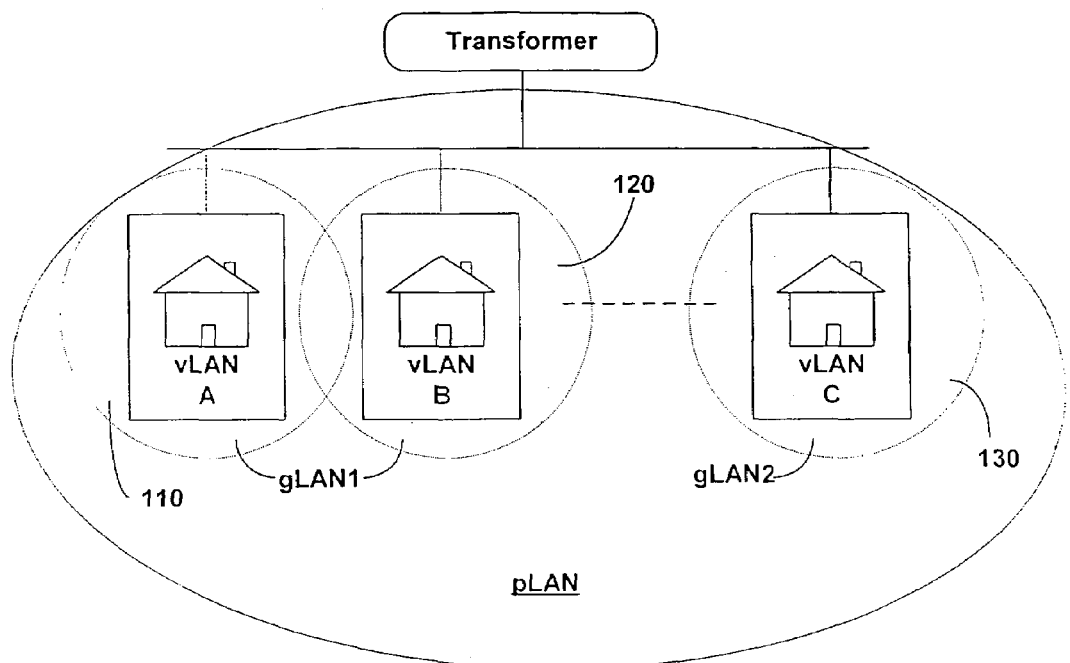
FIG. 1 is a functional block diagram illustrating the architecture of a power line LAN in accordance with the present invention.

Unlike existing networks which include a specification for the medium (cable quality and lengths), the present invention, i.e., the Powerline Network, must work in the existing powerline environment. There are two variables that must be considered: the powerline wire length and a station's signal strength.

Since the powerline is virtually connected from the power source to the home, we need to break this large wire into more manageable areas. To do this, we can first eliminate the wire from the power source to the last step down transformer that delivers power to the customer (e.g. small businesses or residences). This assumption can be made because the Powerline Network signal does not cross this last step down transformer, i.e., a token cannot, and therefore, will never need to be passed between stations that reside on separate step down transformers.

However, several individual homes (or apartments) are present on one transformer, and they will be physically close enough to potentially cause interference. Interference refers to cases where the signals transmitted by one station are heard by other stations on the same transformer. There are two types of interference to consider: interference caused by weak coupling and interference caused by strong coupling. In the case of weak coupling, as one would find between neighboring single family dwellings, their respective networks can coexist as independent networks on the same transformer.

In the case of strong coupling, as one would find in a multi-family dwelling, this presence of interference means that there will be collisions between homes having independent networks on the same transformer. To overcome this problem, a single token needs to be shared between these homes.

Sharing a token between multiple homes on one transformer is not as straightforward as it seems. For example, suppose there are houses 1, 2, and 3, where house 1 interferes with house 2, house 2 interferes with house 3, but house 1 does not interfere with house 3. The token must be shared among all three houses, however, since house 1 and 3 cannot hear each other, the token cannot be passed directly between them. Therefore, a logical ring cannot be formed using a conventional token bus MAC protocol, such as ANSI/IEEE Std 802.4-1990 (R1995).

Before presenting the powerline MAC (PMAC) protocol, we introduce the following terminology to describe the logical boundaries and architecture of the powerline network:

vLAN (virtual LAN)
gLAN (group LAN)
PLAN (powerline LAN)

vLAN:

A vLAN (virtual LAN) is the set of stations that comprise a single customer's network or home network. A vLAN can consist of a single station, however, it will have no other station to communicate with. An ID for the customer's network, called a unique vLAN ID, is assigned at installation time to the vLAN to uniquely identify it. It is assumed that all stations in a vLAN can communicate directly with all other stations in the same vLAN. This assumption simplifies the token passing within a vLAN as will be described below.

gLAN:

A gLAN (group LAN) is a group of vLANs (one at a minimum) that must share a single token. Since each vLAN within a gLAN interferes with at least one other vLAN in the gLAN, the vLANs need to share a single token to ensure that two stations do not talk at the same time. The scope of the MAC protocol is limited to controlling access within the gLAN and identifying instances in which the gLAN must be expanded due to previously undetected sources of interference or the presence of new vLANs.

PLAN:

A PLAN refers to the entire powerline on the customer side of a transformer. A PLAN can have multiple gLANs, each containing at least one vLAN.

FIG. 1 illustrates the interrelation of vLANs, gLANs, and PLANs. Circles 110, 120 and 130 represent the communications areas for a respective vLAN. vLANs A and B share a token in gLAN 1 (circles 110 and 120). vLAN C is the only vLAN in gLAN 2 (circle 130).

When a new station is attached to the Powerline Network, it may find several vLANs communicating on the PLAN. The new station, however, does not have enough information on its own to either choose a vLAN to associate with or to create a new vLAN if it is the first station on this customer's network. It must be told externally to which vLAN it belongs. Choosing the wrong vLAN means that the new station will connect to another customer's network. The problem is made more complex for the class of stations, called non-intelligent devices, that do not have a way to input information, such as appliances and speakers. To address this issue, new stations default to an unassigned vLAN ID.

For the class of stations called intelligent devices, which have an input device, such as a PC keyboard or mouse, the customer must identify the vLAN that the station should be associated with. The station must store this information in non-volatile memory so the customer is not required to enter it every time the station is powered up. There are numerous ways well known in the art for entering such information into an intelligent device, such as, for example, manual input via a keyboard or mouse device.

For non-intelligent devices, the vLAN information must be provided through the network. The process to effect this association is called a directed discovery and is initiated by the customer at an intelligent station. There are two components to the directed discovery: the network support in the MAC protocol, and the device interface and host software. Directed discovery may be achieved, for example, by inputting a serial number into an intelligent device which is part of the network.

There also needs to be a way to remove a previously created association, e.g., when a station is resold to a new customer. The new customer will need to clear the previous vLAN association and provide a new vLAN ID. This may be achieved, for example, by way of a manual reset switch located on the device.

The reason for not establishing a standard process for directed discovery is to allow the non-intelligent device manufacturer to determine the degree of security required for its products. Forcing a standard secure process may require a greater product cost than some manufacturers are willing to incur. An insufficiently secure process can be exploited by malicious neighbors to disrupt the operation of vLANs within range of their station, including assuming control of devices in neighbor's houses.

Operation

This is a high level description of the MAC protocol. The following are the major functions and state machines:
 Join Network
 vLAN Coordinator
 Node
 Token Passing Join Network:

The Join Network state machine is responsible for bringing a station on the network after power on or reset. This process is responsible for first determining if the station has been assigned a unique vLAN ID. If it has not, then it must wait for this information (see previous section on installation). The unique vLAN ID will either be supplied through an intelligent host (like a PC) or through a directed discovery frame. A directed discovery frame is a special MAC control frame that is used to assign a vLAN ID to a specific station in order to force a network association.

When the MAC determines that it has a vLAN ID, it assesses the network to determine whether it should join the network as a vLAN coordinator (if this function is enabled) or as a node. The additional cost associated with the vLAN coordinator function will preclude its availability in most non-intelligent devices.

The station will join the network as a vLAN coordinator only if the MAC is unable to detect a vLAN coordinator with its vLAN ID and if its vLAN coordinator function is enabled. If a vLAN coordinator for the station's vLAN is detected or the vLAN coordinator function is disabled, the station joins as a node. To determine the presence of other vLAN coordinators, the joining station listens to all network traffic for a period of time sufficient to listen to messages from all other network devices within range. This may be on the order of 10s of milliseconds to 100s of milliseconds. Received frames are processed to determine the presence of vLAN coordinators and their respective connection quality. The physical layer management maintains quality tables in real-time while the station is attached to the network. The quality information is important since the new vLAN coordinator must choose a point of entry for joining the gLAN network that will not impede the gLAN token passing. Using the quality information gathered by the physical layer management will ensure the choice is made to join a vLAN coordinator that meets an acceptable level of communication. An acceptable level of communication may be determined based on, e.g., the number of retries to successfully decode a message from another device.

If the new vLAN coordinator does not detect other vLANs, the station generates a token and becomes the vLAN coordinator (and Token Master) for the first (and only) vLAN in a new gLAN. Since the vLAN coordinator is the only station in the vLAN and gLAN, it begins soliciting new nodes and other vLANs coordinators to join the network.

vLAN Coordinator

The vLAN coordinator (vLANc) function is responsible for the following functions:
 Token passing between vLANs
 Token passing between nodes in its vLAN
 Adding nodes to its vLAN
 Adding vLANs to its gLAN
 Calculating Token Hold Times When a new vLAN starts, the first vLAN coordinator-enabled station must listen to the network traffic to either choose an existing vLAN coordinator for entry into the network, or create a new gLAN, as discussed in the join network process above. When the new vLAN joins, it is passed the token from the target vLAN coordinator.

Figure 2:
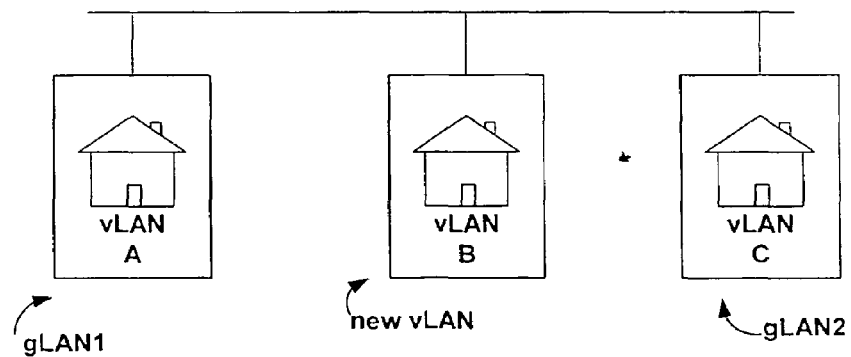
FIG. 2 is a functional block diagram illustrating the merging of two gLANs upon the insertion of a new vLAN.

One complex situation that a new station trying to join a network can encounter occurs when it can hear two vLAN coordinators in separate gLANs. The station must join the network with one of the vLAN coordinators and then effect a merge of the two gLANs into a single gLAN. To illustrate this, FIG. 2 illustrates a new vLAN (vLAN B) that needs to merge two existing gLANs (gLAN 1 and gLAN 2).

Merging Two gLANs

First, the new station joins an existing gLAN as previously described. Once this is done, the vLANc's of the two neighboring gLANs must determine if there is coupling strong enough between them that they cannot coexist. If this is the case, the first vLANc to hear the neighboring vLANc's traffic while holding the token will drop the token and wait for the other vLANc to send a vLAN discovery to join the other gLAN. It is important that token is only dropped while the vLANc possesses the token and in response to receiving a valid message from the conflicting vLANc. This ensures that only one of the two vLANc's will drop the token and rejoin.

When a vLAN coordinator becomes the Token Holder, the vLAN coordinator is responsible for allocating the THT (token hold time) within its vLAN. In order to schedule the traffic within its vLAN, it must first determine which nodes require access to the network and then allocate the available bandwidth among them. Locating the nodes that need access can be done through static polling or dynamic polling by the vLAN coordinator, depending on the node class and population. Nodes return their bandwidth requirements categorized by priority class. After this polling, the vLAN coordinator passes a limited use token to each node that requested the token with a specified THT, i.e., when the node is done or the assigned THT has expired, the token must be returned to the vLAN coordinator.

When passing the token to a node, the vLAN coordinator includes the maximum amount of time the node can use the token, called the token hold time. The Token Master derives the vLAN Token Hold Time (vTHT) by dividing the Token Rotation Time (TRT) by the number of vLANs in the gLAN. This vTHT is passed with the token to each vLANc. The token hold time passed to the node, called node Token Hold Time (nTHT), is the vTHT allocated among the nodes that requested the token during the poll and the administrative requirements of the vLAN coordinator.

The vLAN coordinator is also responsible for adding new nodes to its vLAN. To do this, the vLAN coordinator sends a node discovery MAC control frame with the unique vLAN ID (e.g., input by customer and associated with the devices on a particular vLAN). In response to this frame, new nodes that belong to this vLAN (by correctly matching the unique vLAN ID) reply width a request to join MAC control frame. A node must receive a positive acknowledgment that its request to join was accepted via a subsequent poll before it is part of the vLAN.

The vLAN coordinator is also responsible for adding new vLANs to its gLAN. The vLAN coordinator can only perform this function when it is the Token Master. The vLAN coordinator becomes the Token Master when it is passed the token with the Token Master flag on. In this mode, the vLAN coordinator can send vLAN discovery MAC control frames. In response to such a frame, new vLAN coordinators that have selected this vLAN coordinator as a preferred join location are allowed to send a request to join MAC control frame. A vLAN coordinator must receive a positive acknowledgement that its request to join was accepted via a subsequent token pass before it is part of the gLAN.

The MAC protocol defines when the Token Mastership is passed from vLAN coordinator to vLAN coordinator. This ensures that the overhead of adding new stations to the network is distributed evenly over token rotations.

Node:

A node in the home network is really a slave to its vLAN coordinator, i.e., it waits for the vLAN coordinator to allow it to join the network, to pass it the token, and to set its token hold time. The MAC protocol is intentionally designed to reduce the amount of work a node performs. This allows low cost nodes to be developed.

Once a node receives the token from its vLAN coordinator it must return the token to the vLAN coordinator within the specified token hold time contained in the token pass. A node only receives a limited use token from its vLAN coordinator which prevents it from passing the token to another node.

A node maintains an off-loop timer to ensure that its vLAN coordinator is functioning. If the vLAN coordinator stops functioning, then the node will not receive a token for an extended period of time, the off-loop timer will expire, and the node must rejoin the network.

Token Passing:

We will now describe the properties of token passing in the Powerline Network MAC protocol. Specifically, we will describe:
Doubly-linked loop topology
Token Rotation and Hold Time
3-way Handshake Doubly-linked Loop Topology:

As discussed above, since the nature of the powerline does not allow the physical formation of a ring for token passing, a token bus architecture is used. Since all stations cannot hear all other stations, it is not always possible to construct a logical ring (end stations may not be able to communicate), thus precluding the use of an available token bus standard, such as ANSI/IEEE Std 802.4-1990 (R1995).

The solution used in the Powerline Network MAC protocol is to use a two-level token passing loop. On the first level, stations within a home are grouped into vLANs, with the implicit assumption that all stations in the same vLAN can communicate with each other. Inside these vLANs, the vLAN coordinator manages access to the network by its nodes using polling.

On the second level, the vLAN coordinators from each vLAN form a gLAN token passing loop, but there is still the problem of constructing a logical ring. To solve this problem, a doubly-linked loop is used to link the vLAN coordinators together. To illustrate the difference between a conventional single-threaded loop and a doubly-linked loop, consider a gLAN consisting of two vLANs, A and B, where a third vLAN C chooses A as its entry point. In a single-threaded loop, the token will travel from A to C to B to A; in a doubly-linked loop the token will travel from A to B to A to C to A, i.e., to traverse a network of N nodes, the token traverses (2N−1) nodes, or almost double the number of nodes as in a single threaded loop. The main disadvantage of a doubly-linked loop is the close to doubling of the overhead in passing the token around the loop; however, by using a doubly-linked loop, a logical ring can be established without the problem of physically connecting end vLAN coordinators to form a ring. When a station joins the loop, the successor node on the loop is always the same as the predecessor.

A token that travels from the beginning of the loop to the end and then back again is said to have completed one token rotation. During this single token rotation, each vLAN coordinator is allowed to use the token once, even though it may handle the token multiple times. When the vLAN coordinator can use the token, it is called the token holder; when it must pass the token for maintaining the logical ring without using it, it is called the token passer. Enforcing this distinction maintains fairness in the network access.

In order to maintain this doubly-linked loop, each vLAN coordinator must maintain a table of vLAN coordinators to which it passes the token and remember which vLAN is logically before it in the loop topology. This allows the vLAN coordinator to determine when to consume its vTHT and when to pass the token to the next station in its list. The size of this table, i.e., the maximum number of stations that a vLAN coordinator will directly pass the token to, is limited by the ability of the physical layer management to maintain quality tables due to memory limitations. This limitation, however, does not affect the maximum size of the gLAN, since if a vLAN can successfully communicate with a large number of other vLAN coordinators, a new vLANc can join with one of them instead of the vLANc whose tables are full. It is important to remember that only strongly-coupled neighboring networks need to join into a common gLAN, which will keep the size of the gLAN small.

To illustrate, FIG. 3 begins with a single vLAN, vLAN A, which is the only vLAN in the network.

Next, in FIG. 4, a new vLAN, vLAN B, starts. Since it can hear vLAN A, it determines that it needs to join with vLAN A. vLAN B waits for vLAN A to send a vLAN discovery frame to which it will respond. vLAN A receives this response and includes vLAN B in the token passing loop. vLAN A and vLAN B are now joined and the token is passed back and forth as shown in FIG. 4.

At this point, we have a simple two vLAN gLAN that is equivalent to a ring. So let's make it more interesting. As shown in FIG. 5, a new vLAN, vLAN C, now starts. This vLAN can hear both vLAN A and vLAN B. vLAN C uses the quality information provided by the physical layer management to select an entry point to the gLAN, i.e., either vLAN coordinator A or B. The use of quality information is designed to reduce token passing problems by ensuring that the token is passed between vLAN coordinators with an acceptable connection. vLAN C concluded that vLAN A has the best connection quality and joins it as shown in FIG. 5.

Note that vLAN A is now connected to two vLANs. The letters in the upper lefthand corner of the vLAN objects represent the vLANs that are connected. The significance of the "*" is that, when a token is received from that vLAN, the token is for this vLAN to use. vLAN A must be prevented from using the token each time it receives it. vLAN A should only use the token when it is received from vLAN B to ensures that the token is shared fairly.

FIG. 5 illustrates the doubly-linked loop structure of the network.

This also can be viewed logically as a ring in which vLAN C is connected to vLAN B. Even though the token does not physically travel between vLAN C and vLAN B, vLAN A serves only as a conduit when passed the token by vLAN C, since vLAN A immediately passes the token to vLAN B. Logically this is a ring, even though physically it is not.

Token Rotation and Hold Time:

The Token Rotation Time (TRT) is a fixed value that determines the maximum amount of time that it takes for a token to rotate through a gLAN. Defining a maximum time for token rotation sets a maximum latency (wait time) for access to the media. A defined maximum latency is a critical component in enabling the network to meet a minimum Quality of Service (QoS).

To meet this fixed time, each vLAN coordinator must adhere to the vTHT contained in the token. The Token Master calculates this vLAN Token Hold Time (vTHT) by dividing the TRT by the number of vLANs in the gLAN, while accounting for the administrative overhead of vLAN discoveries. The vLAN coordinator is responsible for passing the token to the next vLAN coordinator in the gLAN to meet the token rotation time.

The vLAN coordinator queries all nodes in the vLAN to determine which nodes require the token. The vLAN coordinator uses this information to distribute the vTHT to the nodes within the vLAN. When the vLAN coordinator passes the token to a node, it also specifies the node Token Hold Time (nTHT). The vLAN coordinator regains control of the token when the nTHT of a node has expired.

The method insures that the token is shared fairly between vLANs and distributed fairly inside each vLAN.

3-Way Handshake:

In a token passing protocol, the transfer of control from one node to the next must be performed reliably to guard against the loss of the token. This is especially important in noisy media, where there is a high probability of a missed transmission. To ensure that a reliable transfer of control is performed, a technique known as a three way handshake is used. In this technique, the originator initiates a transfer with a "Token Pass" message, the addressed recipient responds with an acknowledgment (ACK), to which the originator returns a handshake which consummates the transaction. Two problems arise when using such a three-way handshake on a noisy medium.

First, if the originator does not hear the recipient's ACK, it must retry the Token Pass. In order for the originator to progress to the next state and send the handshake, it must receive the ACK in response to its Token Pass. If the recipient does not hear the Token Pass or the originator does not hear the ACK, the whole sequence must begin again. Both the Token Pass and ACK must be successfully received in one interaction. The probability of success then becomes the square of the probability of receiving a transmission correctly. On a noisy medium this can render a tolerable probability of successful reception insufficient for completing the transfer of control in a timely manner.

Second, upon the originator receiving the ACK, it must send a Handshake. To verify that the recipient has heard this handshake and assumed control, it must listen for recipient activity. If it does not hear any activity, it must retry the handshake. The problem is that on a noisy medium the originator may not hear activity that is in fact there. If it retransmits the Handshake in this case it will cause collisions. If it waits too long to retry in the case where the recipient missed the Handshake, the network will suffer from wasted bandwidth.

These problems can be addressed by the following:
the introduction of a "retry remaining" count in the Token Pass message,
recipient-initiated retries for the ACK, and
recipient-solicited retries of the Handshake
precise inter-frame gap times With these enhancements, the behavior of the three-way handshake is as follows:

Originator:
Send Token Pass with Retry Remaining count
Wait for ACK response
If ACK received send Handshake
If ACK not received, resend Token Pass with updated Retry Remaining count Recipient:
Receive Token Pass
Respond with ACK and decrement Retry Remaining count
If Handshake received, take control
If Handshake not received and Retry Remaining count not zero or Token Pass received, retry ACK Now, the recipient only needs to receive one Token Pass message to start responding with an ACK. It will keep resending the ACK in order to solicit the Handshake until a Handshake is received or the retry count is exhausted. Precise inter-frame gaps are needed to prevent the originator and recipient from overlapping their transmissions. Those skilled in the art will appreciate that the improved handshake procedure will find application in a master-slave relationship as well, such as between a vLAN and one of its nodes.

Figure 6A:
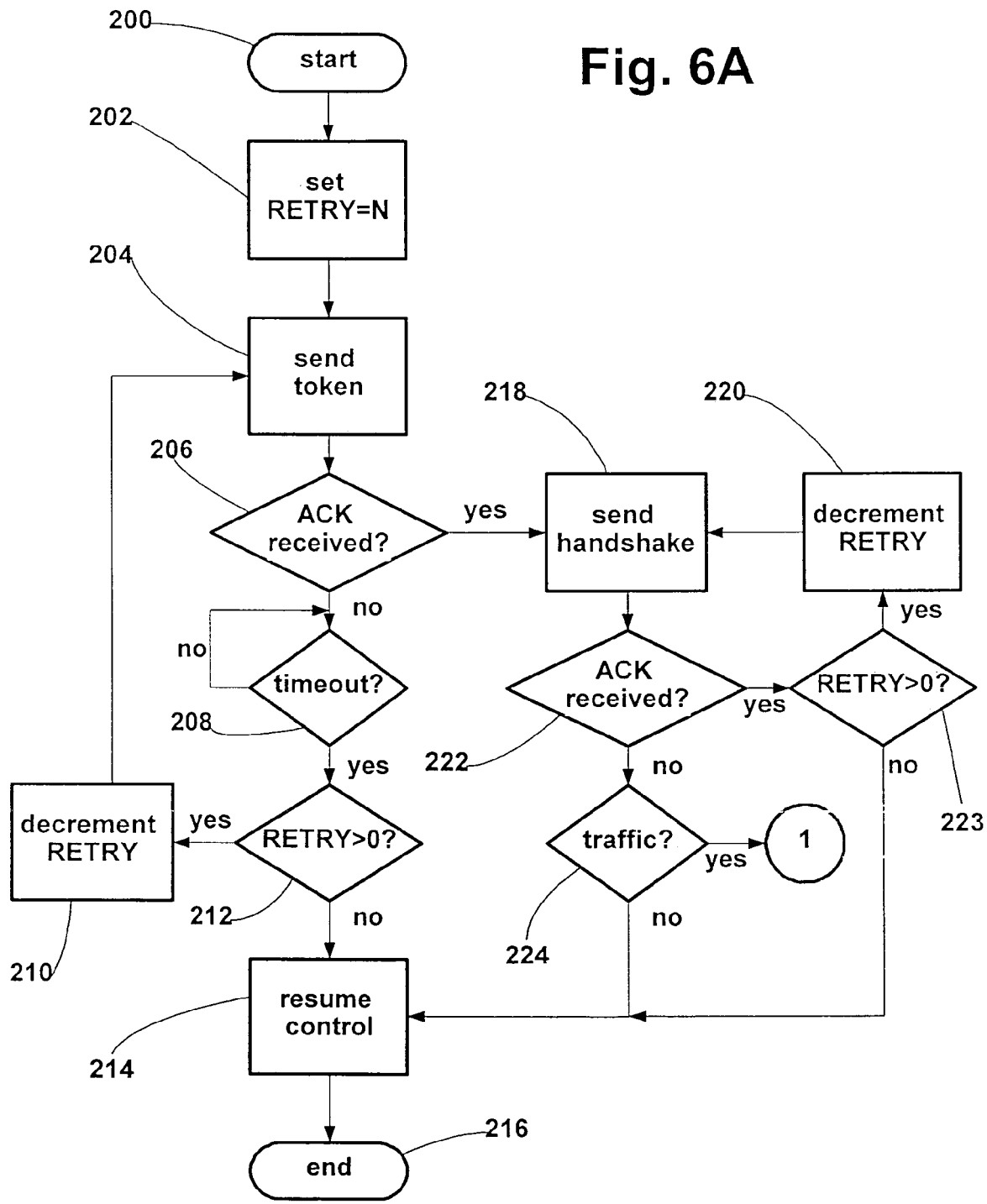
FIGS. 6A and 6B comprise a flowchart illustrating the three-way handshake process.
Figure 6B:
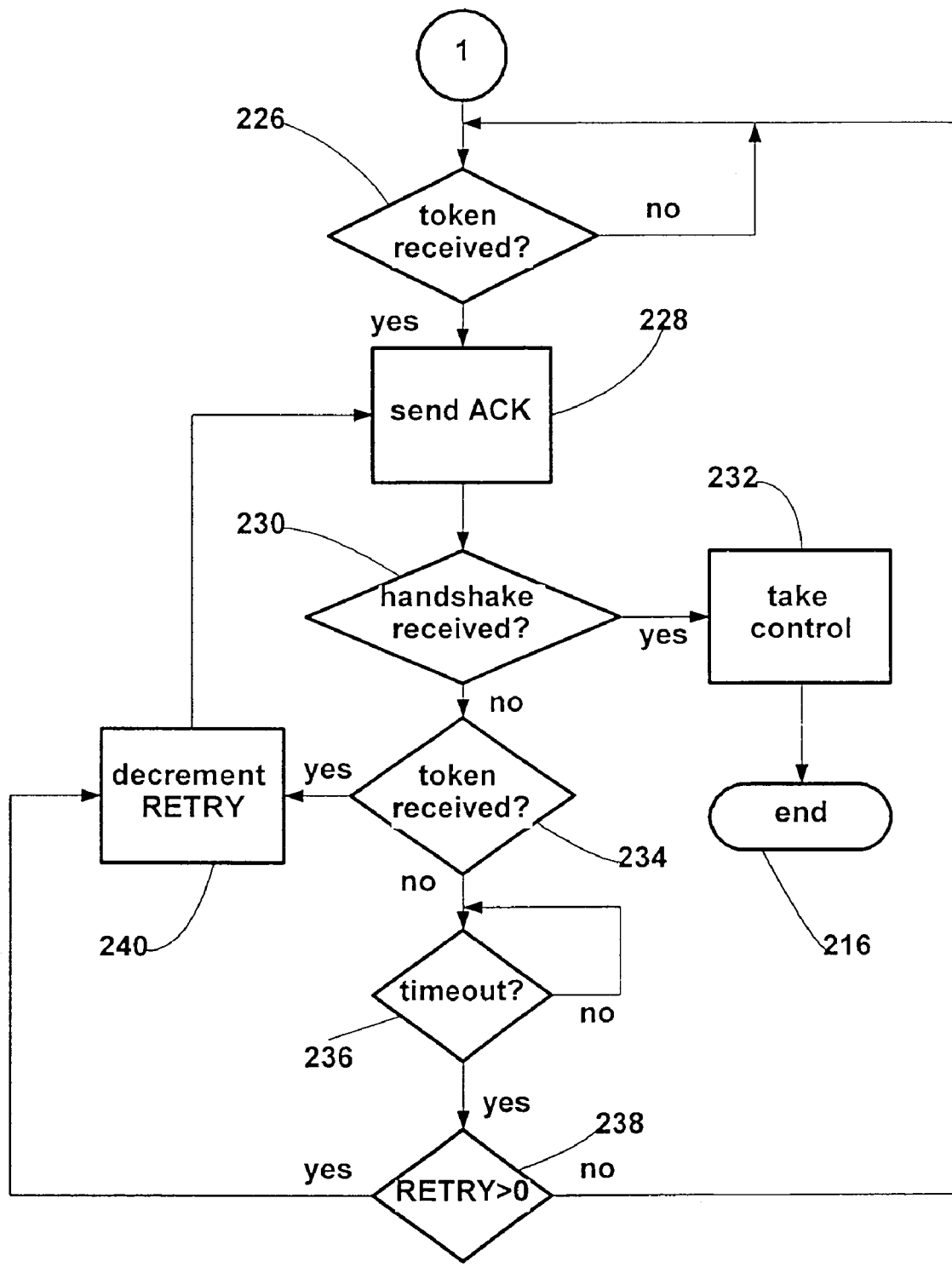

FIGS. 6A and 6B comprise a flowchart which illustrates in more detail the operation of the three-way handshake process. The process begins at Step 200, and the retry remaining count is set to a predetermined value (N) at Step 202 and is sent to the recipient together with a token pass message at block 204.

At block 206, a test is performed to determine whether an ACK message has been received from the recipient and, if so, the originator sends a handshake at block 218. Should a further ACK not be received, the originator monitors the medium for traffic. If traffic is sensed, the token has been successfully passed and control passes to block 226 where the originator now begins to behave as a recipient.

If a further ACK had been received at block 222, and the retry count is not zero, the retry count is decremented and the handshake is resent with the new retry count at block 220, restoring control to block 218. If the retry count has reached zero, the originator retains the token and resumes control (block 214), with the handshake process ending at block 216.

Had an ACK not been received at block 206, after a predetermined time-out (block 208), if the retry count is not zero, the retry count is decremented (block 210) and control returns to block 204 where the token and new retry count are sent to the recipient again. If the retry count is found to be zero (block 212), the token pass is cancelled and the originator resumes control (block 214) with the handshake routine terminating at block 216.

The portion of the flowchart appearing in FIG. 6B illustrates the process performed at each vLAN which is not in possession of the token. As explained above, the handshake routine reaches block 226 after a successful token pass by a vLAN coordinator. At block 226, a token pass message addressed to this vLAN coordinator is awaited and, when received, an ACK message is sent to the originator at block 228. At block 230, a test is performed to determine whether a handshake message has been received and, if so, the present vLAN coordinator takes control at block 232, and the handshake procedure ends at block 216. The procedure will not be started again by the current token possessor until it is ready to pass the token. If a handshake message was not sensed at block 230, a test is performed at block 234 to determine whether a new token pass message has been received and, if so, the retry count is decremented at block 240, and control returns to block 228. If a new token pass message is not detected at block 234, after a predetermined time-out interval (block 236), if the retry count is greater than zero, control returns to block 240 again to resend the ACK and attempt receipt of a handshake signal. If the retry count has reached zero at block 238, the token pass has failed and control returns to block 226 where a new token pass attempt is awaited.

Use of a Single Elected Node to Perform Traffic Scheduling and Token Passing Loop Administration Without a Single Point of Failure There are two conflicting goals when creating a system architecture for a robust networking solution with QoS support that are exacerbated on a noisy medium. One goal is not to have a single point of failure. If one node on the network is no longer operable, the remaining nodes need to continue functioning. This is especially true with regard to access to the network medium. The complexity of enforcing QoS guarantees is greatly reduced if a single unit can perform this function. In the case of managing multiple logical networks, there are two levels of QoS administration that must be performed. First, within a single logical network the available time must be allocated, and second, the available time must be allocated amongst the individual logical networks.

Figure 7:
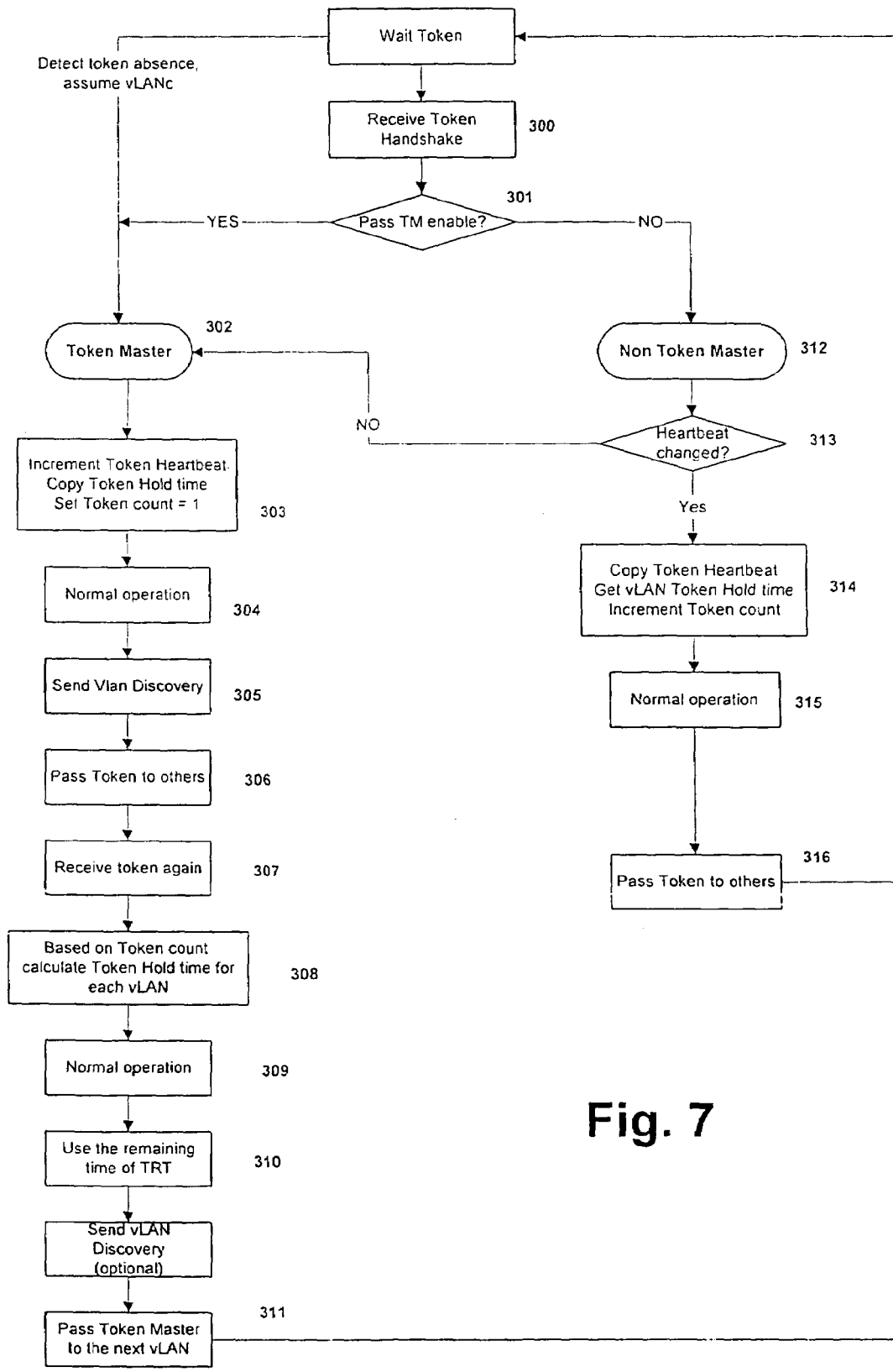
FIG. 7 is a flowchart illustrating the process for using a singular elected node to perform traffic scheduling and token passing loop administration without a single point of failure.

A solution that reconciles these conflicting goals within our doubly-linked token passing system is as explained below, with reference to the flowchart of FIG. 7.

First, at the multiple logical network level, the concept of a token master is introduced. The token master is a single vLANc that is responsible for allocating the TRT amongst the vLANs, so each vLAN gets a fair share of the TRT, called vTHT, or vLAN Token Hold Time. Each time the token is held by a vLANc it increments the vLAN count field in the token (block 314). When the token is received by the Token Master (block 307) it has an accurate count of the number of vLANs in the network, which it can then use to calculate the vTHT for the next TRT (block 303). This count is reset by the token master for the next TRT. Additionally the Token Master is the only vLANc that can perform vLAN discoveries (block 305), allowing this overhead to be spread evenly over token rotation times, and it is the only vLANc that could use any remaining time from the TRT that is not consumed by the other vLANs in a given TRT. In order to maintain fairness among the vLANs and not to have a single point of failure, the token mastership is passed from one vLANc to the next each TRT (block 311). To prevent the loss of the token mastership, a token heartbeat is maintained that is incremented each time the token mastership is passed (block 303). If any vLANc observes the same value of the token heartbeat two times in row (block 313), it can safely conclude that the token mastership has been lost and it will immediately reclaim it (block 302). With this technique, the first vLANc downstream from the token master will be the first one to regenerate the token mastership and it will do so without conflict.

Second, at the logical network level, any node which is vLANc-enabled can become the vLANc. The vLANc is responsible for administering the allocated vTHT, i.e., traffic scheduling, amongst the nodes in the logical network. In the event that the current vLANc fails, the remaining vLANc-enabled nodes will detect this absence and one of the remaining nodes will assume the vLANc status.

Polling Overhead

Non-deterministic multiple access schemes, such as CSMA, are desirable due to their simplicity and low delay in accessing the medium when traffic is light. Deterministic access schemes, such as token passing and polling, consume a constant overhead whether the network is heavily or lightly loaded. When the node population becomes large and traffic is light, this becomes a performance impediment. This problem is further exacerbated when QoS guarantees need to be maintained; if the node population exceeds a certain limit for the network, the polling/token passing overhead renders it impossible to satisfy the QoS requirements.

A solution to this problem can be realized by noting that there are two aspects to satisfying a QoS guarantee. First, there is the establishment of the connection and its attendant requirements. Second, there is the maintenance of the connection and ensuring its QoS guarantees are met. A longer delay can easily be tolerated in the establishment of the connection, while during the life of the connection the frequency of access must be sufficient to adhere to the delay requirements. The device performing the traffic scheduling can create polling frequencies based on the presence or absence of active connections and their requirements. If a node has no active connections, it can be granted access to the medium at a much slower rate. Nodes with active connections will be granted access at the rate required to maintain their QoS guarantees or greater, depending on the level of traffic in the network.

In the power line network, data is transmitted in the form of packets or frames having a predefined format, with each data frame including a synchronization preamble, followed by framing information, followed by the encoded data. At a receiving location, the transmitted signal is initially received and processed by conventional front end circuitry, which includes appropriate surge protection and/or filtering circuits. The received signal is then input to a synchronizing circuit which utilizes the synchronization preamble contained in the data frame to achieve proper timing and synchronization. Once synchronization is achieved, the data portion of the frame is input to a demodulator circuit which converts the data into binary digital format. At this point, the data has not yet been error detected or error corrected.

In a noisy medium, such as a power line, if the timing of a transmission on the medium could be predicted, the receiver could establish a narrow synchronization window around the expected synchronization preamble to increase its chances of receiving the transmission. If the timing could not be predicted the receiver must keep its receiver enabled, increasing the probability of false synchronization. In the time it takes to reject such a false synchronization, it may miss the synchronization preamble of the actual transmission.

In order to predict the timing of a transmission, it is necessary to have precise inter-frame gap timing, and predictable response size. The precise inter-frame gap allows the transmitter to trigger the enabling of its receiver from the end of its transmission. The predictable response size allows the transmitter to time the start of its next transmission in the event that it missed the receiver's response.

Figure 8:
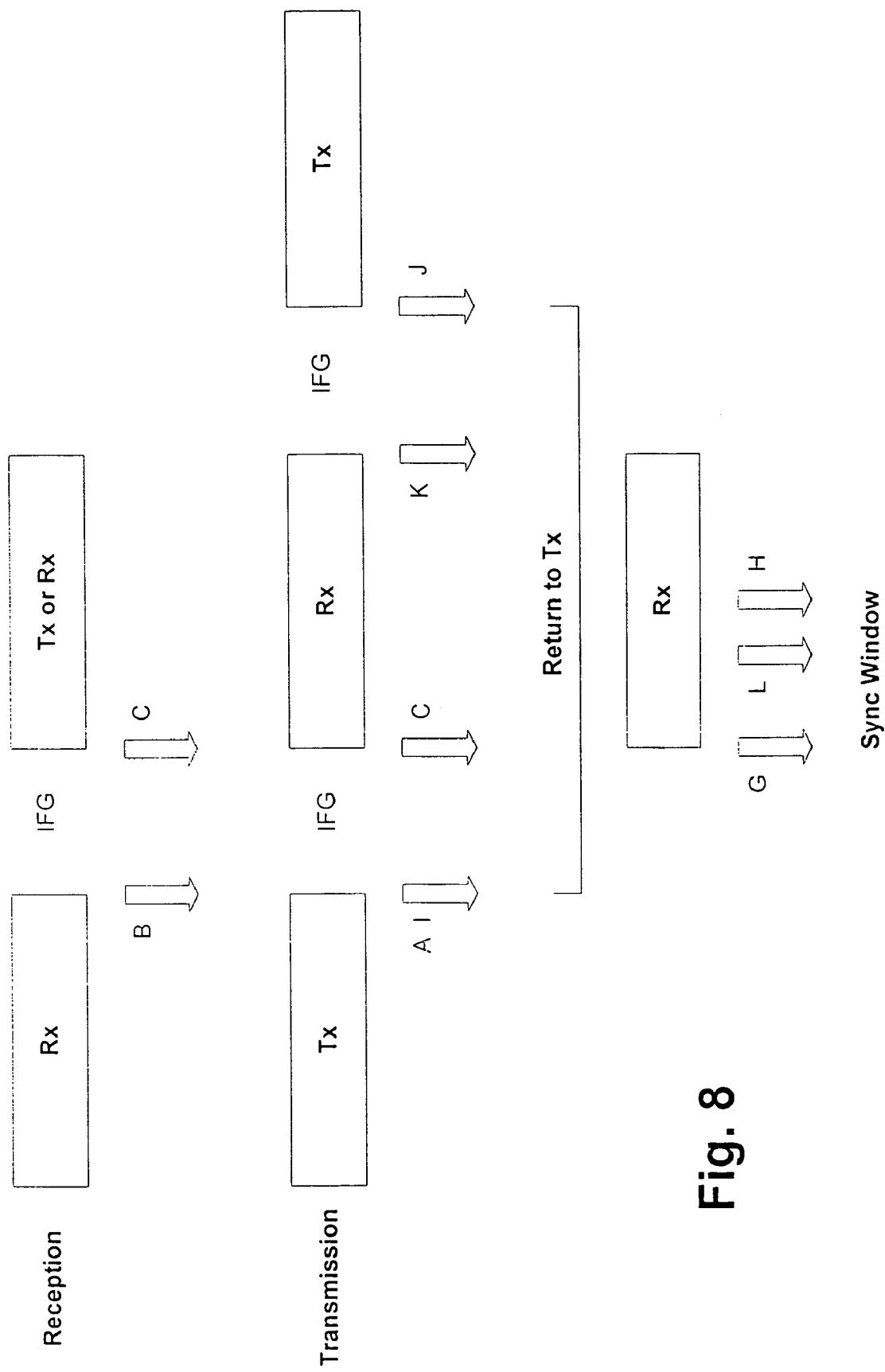
FIG. 8 is a functional block diagram illustrating the process for using receiver synchronization window.

The operation of such a system for a receiver and transmitter is illustrated in FIG. 8. For a receiver:

At the end of a frame reception, B, the inter-frame gap, IFG, starts;

During the IFG, B to C, determine if the next event is a reception or transmission; and At the expiry of the IFG timer, C, trigger the receiver or transmitter as determined during the IFG.

For a transmitter:

At the end of a transmission the IFG starts, A, and the Return to Transmit timer starts, I;

At the expiry of the IFG, C, start the Sync Window, G, for an expected received frame;

If a valid frame is received end the sync Window, L, and complete the frame reception and start the IFG, K;

Upon the expiry of the IFG, J, start the next frame transmission; and

If the sync window expires without receiving a valid frame, H, turn off the receiver and wait for the Return To Transmit time to expire, J, and start the next frame transmission.

In order to improve reliability of communication in the noisy powerline environment, a communication signal is specially processed. When acquiring synchronization, a received signal is oversampled (i.e., sampled many times per bit or symbol, a multiple of the Nyquist rate) and correlated against a reference waveform. The received signal will contain errors introduced in transmission. As is well known, the longer a sequence of bits, the more accurate the measurement of bit error rate (BER). Therefore the length of the synchronization preamble is chosen to be sufficiently long both to provide the ability to distinguish between sampling positions with regard to goodness of synchronization and to serve as an indicator of the goodness of an equalizer setting. As is also well known, the longer a pseudorandom code, the larger the number of possible mutually orthogonal sequences. Therefore the length of the synchronization preamble is also chosen to be sufficiently long to provide the ability to allow for a sufficient number of mutually weakly cross-correlated preambles to be used to allow noninterference of simultaneous communications of multiple weakly interfering logical networks. In the preferred embodiment, the preamble is a 63-bit length code, i.e., 63-bit maximal length pseudorandom code, the sampling rate is 32 samples per bit, and the modulation is binary phase shift keying, BPSK (1 bit per symbol).

Figure 9:
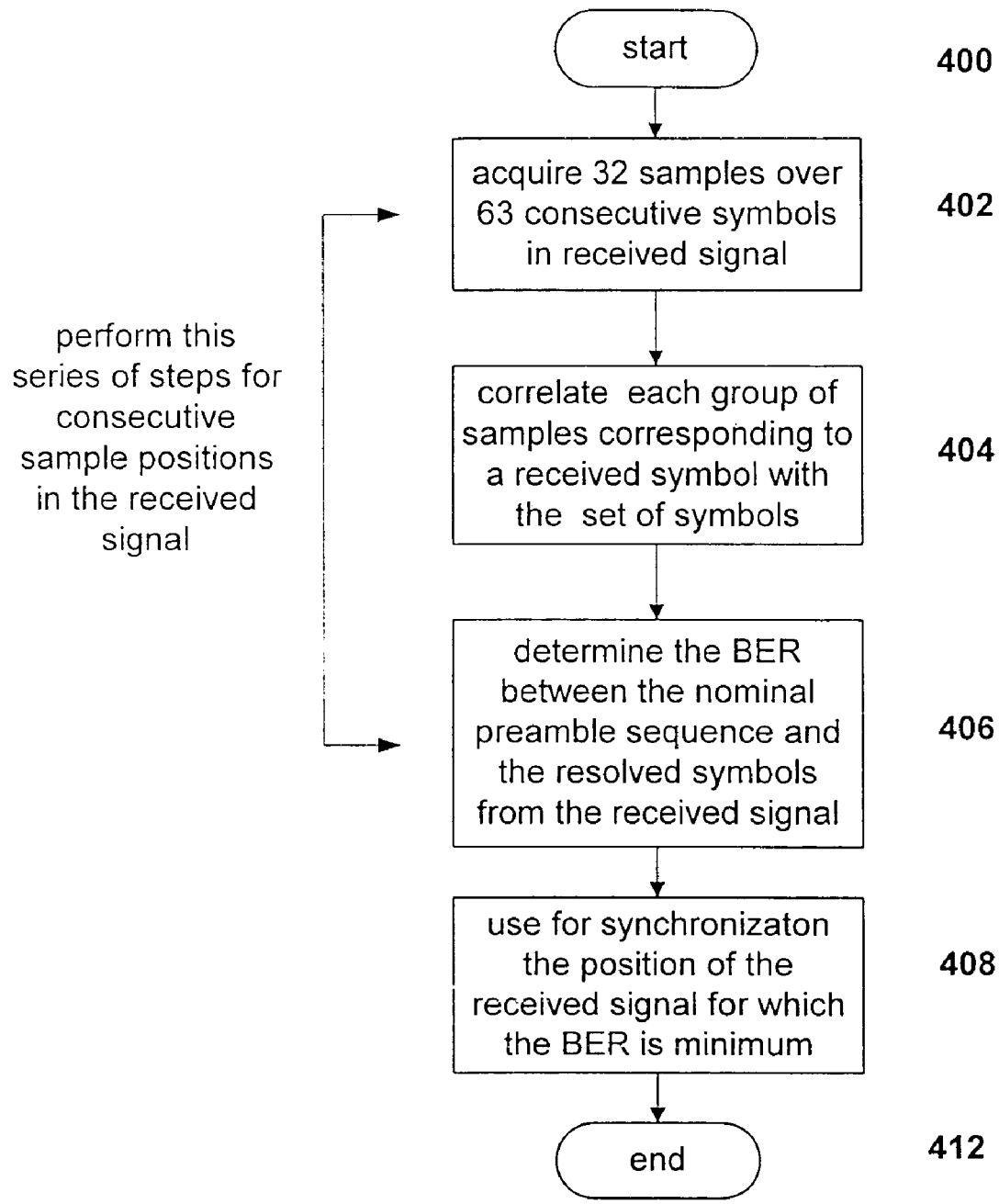
FIG. 9 is a flowchart illustrating the process for using oversampling; correlation and bit error rate monitoring to improve the synchronization process.

The synchronization process will be described with the aid of the flowchart of FIG. 9, wherein the process starts at block 400.

The process begins at step 400. At step 402, 32 samples are acquired for each of the first 63 symbols in the received signal. Each group of 32 samples corresponding to a symbol is then correlated with the nominal set of symbols, also called reference waveforms (block 404) to resolve each group to a symbol, and the BER is determined between the nominal sequence and the resolved set of symbols (block 406). The steps in blocks 402-406 are repeated in each sample position of the received signal. For synchronization purposes, we use the position of the received signal which yields the lowest BER (block 408).

In the case of transmission over a network communications medium with noise, frequency-dependent attenuation, and reflections, the oversampling is required for sufficient resolution to obtain a sufficiently low BER. For example, in the preferred embodiment, against 32 contiguous samples acquired, at block 402, of each of 63 symbols of a received stream (for all 63-bit intervals that would occur in a preamble), the reference waveform is correlated against these samples, and the number of errors for 63 bit positions is calculate. A preamble is deemed detected when there is a sufficiently low, predefined bit error count.

In matching the preamble sequence against the received sequence over all bit positions of the preamble, multiple minima in BER will typically be found as a function of sampling position. For example, in a BPSK waveform with one cycle per bit, a calculation of preamble BER versus sampling position will yield multiple minima occurring at approximately 2 sampling locations per 32-bit sampling interval, owing to the anti-symmetry of the BPSK bit waveform. It will also yield multiple minima occurring over multiple 32-bit interval, owing to multiple reflections of the medium. One minimum will be optimal, yielding the lowest BER of the data following the preamble, and it can be distinguished by the synchronizer choosing the sampling position with the lowest minimum in preamble BER over the multiple minima. The BER of the preamble can also be used to rank the particular equalizer setting that was used to select that preamble.

In the case of multiple logical networks, for example multiple vLANs on a common gLAN, the PMAC protocol can allow simultaneous logical operation for both strong and weak coupling between vLANs. A further method of increasing the number of allowable logical networks without a decrease in network bandwidth for many weakly-coupled logical networks is by means of multiple preamble sequences with low cross-correlation. In the case of weak coupling, there is little interference from network to network in increasing the noise floor, but there is still the possibility of synchronizing to the wrong packet in the case of simultaneous transmissions from different logical networks. Assigning preambles that have low cross-correlation for each weakly-interfering logical network eliminates this possibility.

To implement the synchronizer, the correlator over each 32 samples can be replaced with, for example, correlators over 4 samples. Then the implementation consists of a sliding string of correlators, changing every 4 samples. For the 4 correlation values within a 4-sample interval, only 3 additional rotations are then required.

An equalizer converges on an optimal setting for minimal BER. While the equalizer converges, the BER starts from a higher number and converges to a lower number. While the equalizer is converging, BPSK modulation with, for example, 2 cycles per bit can be used, changing to 1 cycle per bit as the equalizer setting approaches the optimum (The more cycles per bit, the more robust the reception will be for a suboptimal equalizer setting). The first block in the transmitted frame can indicate to the receiver which modulation is used. The transmitter makes the decision based on information received from each frame sent by the receiver, for example an ACK or NAK.

Although preferred embodiments of the invention have been disclosed for illustrative purposes, those skilled in the art will appreciate that many additions, modifications and substitutions are possible, without departing from the scope and spirit of the invention as defined by the accompanying claims.

What is claimed:

1. A media access control (MAC) controller for a network providing communication for network stations located at a plurality of customer premises and sharing a communication medium, each of the premises having a plurality of network stations, the MAC controller comprising:

a virtual local area network (vLAN) controller, providing access to the communication medium and communication among the stations located at a single customer's premises, to define a vLAN therebetween; and a group local area network (gLAN) controller providing access to the communication medium and communication among interfering vLANs, two vLANs being considered to be interfering when one can sense communications over the medium from a station in the other; a MAC controller being provided in at least one station in a vLAN, wherein the MAC controller is constructed to utilize a token passing protocol to control access to the medium, and wherein the gLAN controller is constructed to utilize a token passing protocol among vLANs to control access to the medium thereby, a vLAN being capable of retaining the token when received from one of the other vLANs, but must pass the token immediately when receiving it from any other vLAN except for the one of the other vLANs, whereby, although the vLANs in a gLAN are connected in a bus configuration, they pass the token in a logical ring topology in which the ring includes vLANs that are unable to communicate directly.

2. The MAC controller of claim 1 wherein the MAC controller is connected to use as the communication medium the portion of a power line at the output of a last step down transformer.

3. The MAC controller of claim 1, wherein the gLAN controller is constructed to control the transfer of the token between two vLANs, an originator and a recipient, through a handshake procedure requiring a token pass message from the originator, an ACK message from the recipient in response to the token pass message, and a handshake message from the originator in response to the ACK for the recipient to assume possession of the token:

the originator providing a predefined retry remaining count along with the token pass message and re-sending the token pass message together with a decremented retry remaining count, upon failure to receive an ACK message, until the retry remaining count is zero, whereupon the originator retains the token; and the recipient responding to the token pass message by sending an ACK accompanied by a decremented retry count, and continuing to repeat these steps upon failure to receive a handshake message, until the retry remaining count is zero, whereupon the token transfer fails.

4. The MAC controller of claim 3, wherein the gLAN controller is constructed to provide a token master flag to one of the vLANs, defined as a token master, the token master computing a vLAN token hold time (vTHT), the token being passed around a logical loop together with vTHT, each vLAN other than the token master retaining the token for no longer than the vTHT before passing it on.

5. The MAC controller of claim 4, wherein the gLAN controller is constructed so that the token master flag is retained by one of the vLANs and sent to the next in the logical loop after the token has made a complete traversal of the entire loop, the vLAN in possession of the token master flag being the token master.

6. The MAC controller of claim 5, wherein the gLAN controller is constructed to maintain a token heartbeat which is incremented every time the token master flag is passed, a vLAN seizing possession of the token master flag upon encountering the same heartbeat consecutively, whereby loss of token mastership is avoided.

7. The MAC controller of claim 3, wherein the vLAN controller is constructed to poll stations in the process of granting them access to the medium, polling overhead being managed by granting medium access to a station with an active connection at a rate required to maintain quality of service guarantees, while a station without an active connection is granted access at a much slower rate determined at the convenience of the controller.

8. The MAC controller of claim 1, wherein the gLAN controller is constructed to control the transfer of the token between two vLANs, an originator and a recipient, through a handshake procedure requiring a token pass message from the originator, an ACK message from the recipient in response to the token pass message, and a handshake message from the originator in response to the ACK for the recipient to assume possession of the token:

the originator providing a predefined retry remaining count along with the token pass message and re-sending the token pass message together with a decremented retry remaining count, upon failure to receive an ACK message, until the retry remaining count is zero, whereupon the originator retains the token; and the recipient responding to the token pass message by sending an ACK accompanied by a decremented retry count, and continuing to repeat these steps upon failure to receive a handshake message, until the retry remaining count is zero, whereupon the token transfer fails.

9. The MAC controller of claim 8, wherein the gLAN controller is constructed to provide a token master flag to one of the vLANs, defined as a token master, the token master computing a vLAN token hold time (vTHT) by dividing the round trip time, TRT, of the token around the logical loop by the number of vLANs in the gLAN, the token being passed around a logical loop together with vTHT, each vLAN other than the token master retaining the token for no longer than the vTHT before passing it on.

10. The MAC controller of claim 9, wherein the gLAN controller is constructed so that the token master flag is retained by one of the vLANs and sent to the next in the logical loop after the token has made a complete traversal of the entire loop, the vLAN in possession of the token master flag being the token master.

11. The MAC controller of claim 10, wherein the gLAN controller is constructed to maintain a token heartbeat which is incremented every time the token master flag is passed, a vLAN seizing possession of the token master flag upon encountering the same heartbeat consecutively, whereby loss of token mastership is avoided.

12. The MAC controller of claim 9, wherein the vLAN controller is constructed to poll stations in the process of granting them access to the medium, polling overhead being managed by granting medium access to a station with an active connection at a rate required to maintain quality of service guarantees, while a station without an active connection is granted access at a much slower rate determined at the convenience of the controller.

13. The MAC controller of claim 8, wherein the vLAN controller is constructed to poll stations in the process of granting them access to the medium, polling overhead being managed by granting medium access to a station with an active connection at a rate required to maintain quality of service guarantees, while a station without an active connection is granted access at a much slower rate determined at the convenience of the controller.

14. The MAC controller of claim 1, wherein the gLAN controller is constructed to provide a token master flag to one of the vLANs, defined as a token master, the token master computing a vLAN token hold time (vTHT) by dividing the round trip time, TRT, of the token around a logical loop by the number of vLANs in the gLAN, the token being passed around the logical loop together with vTHT, each vLAN other than the token master retaining the token for no longer than the vTHT before passing it on.

15. The MAC controller of claim 14, wherein the gLAN controller is constructed so that the token master flag is retained by one of the vLANs and sent to the next in the logical loop after the token has made a complete traversal of the entire loop, the vLAN in possession of the token master flag being the token master.

16. The MAC controller of claim 15, wherein the gLAN controller is constructed to maintain a token heartbeat which is incremented every time the token master flag is passed, a vLAN seizing possession of the token master flag upon encountering the same heartbeat consecutively, whereby loss of token mastership is avoided.

17. The MAC controller of claim 14, wherein the vLAN controller is constructed to poll stations in the process of granting them access to the medium, polling overhead being managed by granting medium access to a station with an active connection at a rate required to maintain quality of service guarantees, while a station without an active connection is granted access at a much slower rate determined at the convenience of the controller.

18. The MAC controller of claim 1, wherein the vLAN controller is constructed to poll stations in the process of granting them access to the medium, polling overhead being managed by granting medium access to a station with an active connection at a rate required to maintain quality of service guarantees, while a station without an active connection is granted access at a much slower rate determined at the convenience of the controller.

19. The MAC controller of claim 1, wherein the vLAN controller is constructed to poll stations in the process of granting them access to the medium, polling overhead being managed by granting medium access to a station with an active connection at a rate required to maintain quality of service guarantees, while a station without an active connection is granted access at a much slower rate determined at the convenience of the controller.

20. A media access control (MAC) controller for a network providing communication for network stations located at a plurality of customer premises and sharing a communication medium, each of the premises having a plurality of network stations, the MAC controller comprising:
  a virtual local area network (vLAN) controller, providing access to the communication medium and communication among the stations located at a single customer's premises, to define a vLAN therebetween; and
  a group local area network (gLAN) controller providing access to the communication medium and communication among interfering vLANs, two vLANs being considered to be interfering when one can sense communications over the medium from a station in the other; a MAC controller being provided in at least one station in a vLAN,
  wherein the MAC controller is constructed to utilize a token passing protocol to control access to the medium, and
  wherein the gLAN controller is constructed to provide a token master flag to one of the vLANs, defined as a token master, the token master computing a vLAN token hold time (vTHT) by dividing the round trip time, TRT, of the token around a logical loop by the number of vLANs in the gLAN, the token being passed around the logical loop together with vTHT, each vLAN other than the token master retaining the token for no longer than the vTHT before passing it on.

21. A media access control (MAC) controller for a network providing communication for network stations located at a plurality of customer premises and sharing a communication medium, each of the premises having a plurality of network stations, the MAC controller comprising:
  a virtual local area network (vLAN) controller, providing access to the communication medium and communication among the stations located at a single customer's premises, to define a vLAN therebetween; and
  a group local area network (gLAN) controller providing access to the communication medium and communication among interfering vLANs, two vLANs being considered to be interfering when one can sense communications over the medium from a station in the other; a MAC controller being provided in at least one station in a vLAN,
  wherein the MAC controller is constructed to utilize a token passing protocol to control access to the medium, and
  wherein the vLAN controller is constructed to poll stations in the process of granting them access to the medium, a polling overhead being managed by granting medium access to a station with an active connection at a rate required to maintain quality of service guarantees, while a station without an active connection is granted access at a much slower rate determined at the convenience of the controller.

* * * * *